United States Patent
Erb et al.

(10) Patent No.: US 8,135,783 B2
(45) Date of Patent: Mar. 13, 2012

(54) METHOD AND APPARATUS FOR IDENTIFYING OCCURRENCES OF A GIVEN NETWORK ADDRESS

(75) Inventors: Paul Andrew Erb, Ottawa (CA); Katayoun Nasiri, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 251 days.

(21) Appl. No.: 11/998,033

(22) Filed: Nov. 27, 2007

(65) Prior Publication Data
US 2009/0138569 A1    May 28, 2009

(51) Int. Cl.
*G06F 15/16* (2006.01)
(52) U.S. Cl. .................. 709/206; 709/205
(58) Field of Classification Search .......... 709/205, 709/206; 370/392, 431, 229, 358; 714/4
See application file for complete search history.

(56) References Cited

U.S. PATENT DOCUMENTS

| | | | |
|---|---|---|---|
| 6,904,137 B2 * | 6/2005 | Brandt et al. | 379/126 |
| 7,088,805 B1 * | 8/2006 | Moore et al. | 379/121.05 |
| 2002/0150243 A1 * | 10/2002 | Craft et al. | 380/201 |
| 2003/0002639 A1 * | 1/2003 | Huie | 379/114.27 |
| 2004/0249951 A1 * | 12/2004 | Grabelsky et al. | 709/227 |

FOREIGN PATENT DOCUMENTS

| | | |
|---|---|---|
| EP | 1701526 A1 | 9/2006 |
| WO | WO 2006/071157 A1 | 7/2006 |

* cited by examiner

*Primary Examiner* — Joon H Hwang
*Assistant Examiner* — Joel Mesa

(57) ABSTRACT

A method and apparatus for identifying occurrences of a given network address is provided. A request is transmitted comprising data associated with the given network address to at least one remote communication device, the request for triggering a lookup of at least a portion of the data in a directory associated with the at least one remote communication device. At least one message is received indicative that the data associated with the given network address is present in the directory.

18 Claims, 2 Drawing Sheets

METHOD AND APPARATUS FOR IDENTIFYING OCCURRENCES OF A GIVEN NETWORK ADDRESS

FIELD

Figure 1:
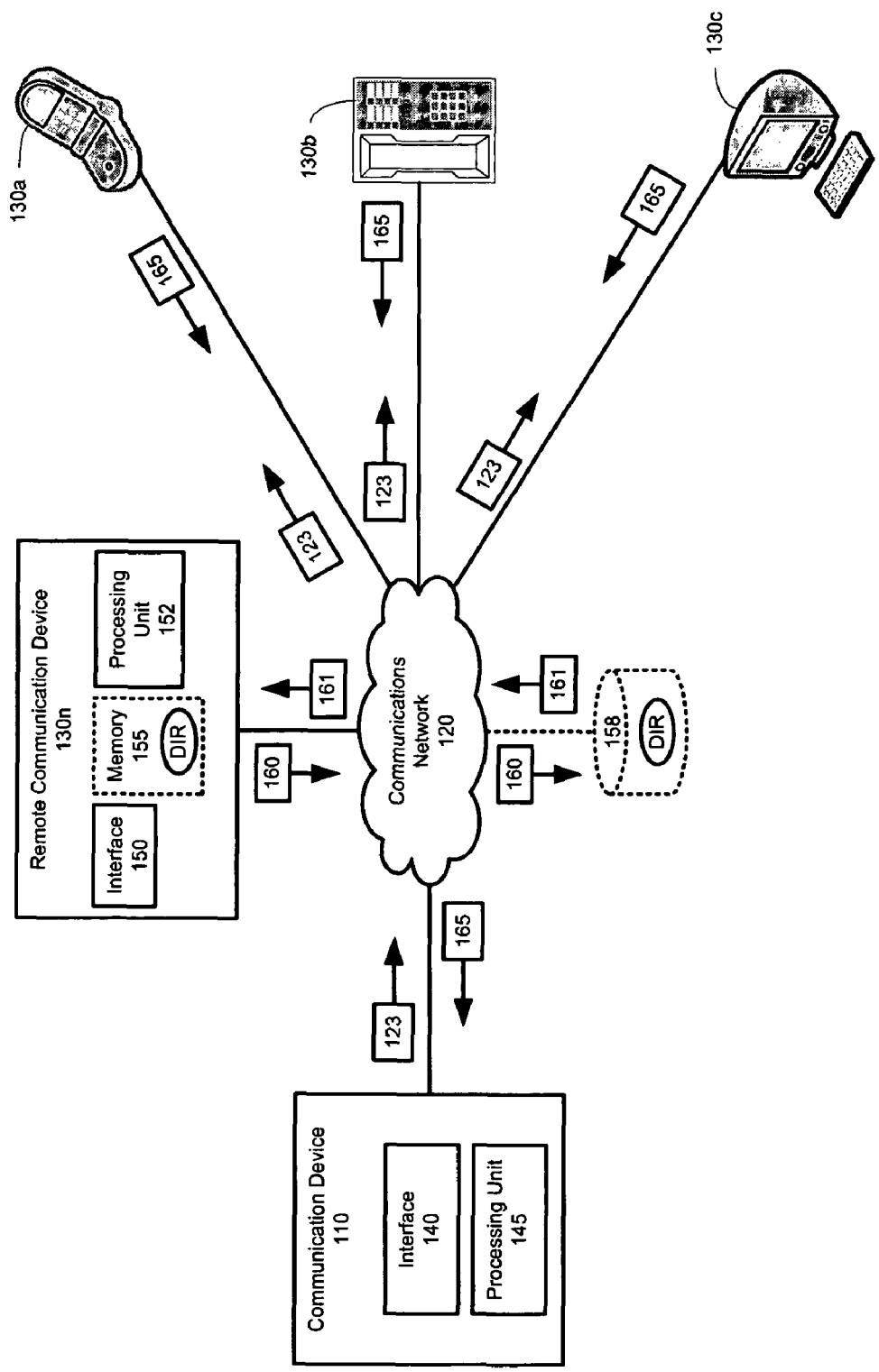

The specification relates generally to electronic personal directories and specifically to a method and apparatus for identifying occurrences of a given network address.

BACKGROUND

The use of electronic personal directories allows the storage of a specific network address on any number of communication devices unrelated to the specific network address. This storage may be used to quickly transmit a message and/or contact an individual associated with the specific network address, and as a way of managing contacts/relationships. Under certain conditions it may be useful to know who has potentially been in contact with the specific network address. For example, in the case of pandemics, terrorism prevention and/or crime investigations, it may be important to determine who has potentially been in contact with an individual associated with the specific network address. Less dramatically, in a company it may be useful to determine who has potentially been in contact with an individual associated with the specific network address in order to prevent redundant contact with the individual, for example a client or potential client.

In some instances, telephone records and/or call history (where available) can be used to identify who has been in contact with the specific network address. However, this only identifies established calls involving the telephone number, and is further limited to the telephone system where the records are collected.

SUMMARY

A first broad aspect of an embodiment seeks to provide a method of identifying occurrences of a given network address. The method comprises transmitting a request comprising data associated with the given network address to at least one remote communication device, the request for triggering a lookup of at least a portion of the data in a directory associated with the at least one remote communication device. The method further comprises receiving at least one message indicative that the data associated with the given network address is present in the directory. In some of these embodiments, the method further comprises generating the request.

In some embodiments of the first broad aspect, the data comprises at least one of a telephone number, an internet protocol address, a URL, an e-mail address, a name of a user associated with the network address and a name of a company associated with the given network address. In some of these embodiments, the data further comprises a network address associated with at least one of the at least one remote communication device and the directory.

In other embodiments of the first broad aspect, transmitting comprises transmitting the request to a plurality of remote communication devices, the plurality of remote communication devices comprising the at least one remote communication device. In some of these embodiments, receiving at least one message comprises receiving the at least one message from at least one of the plurality of remote communication devices, the at least one message comprising a network address associated with at least one of the plurality of remote communication devices and a directory associated with at least one of the plurality of remote communication devices.

In further embodiments of the first broad aspect, the method further comprises compiling a list of directories which contain the given network address, from the at least one message.

In yet further embodiments of the first broad aspect, the method further comprises compiling a list of remote communication devices which contain the given network address, from the at least one message.

In some embodiments of the first broad aspect, the request is packet based. In some of these embodiments, the request comprises a SIP request.

In some embodiments of the first broad aspect, the request comprises an ISDN signal.

In other embodiments of the first broad aspect, the method further comprises encrypting the request.

In further embodiments of the first broad aspect, the request further comprises a security authorization code.

A second broad aspect of an embodiment seeks to provide a method of identifying occurrences of a network address. The method comprises receiving a request comprising data associated with the network address. The method further comprises, responsive to the receiving the request, looking up the data in a directory of contacts. The method further comprises transmitting a message, the message indicative that the data associated with the network address is present in the directory. In some of these embodiments, the message comprises a flag indicative that the data associated with the network address is present in the directory. In other of these embodiments, the message comprises an identifier of at least one of the directory and a communications device associated with the directory. In some of these embodiments, the identifier comprises at least one of a telephone number, and IP address, an e-mail address, the name of a user associated with the remote communications device, and a MAC address.

In some embodiments of the second broad aspect, the request is encrypted, and the method further comprises decrypting the request.

A third broad aspect of an embodiment seeks to provide a communications device for identifying occurrences of a given network address. The communication device comprises an interface enabled for transmitting a request comprising data associated with the given network address to at least one remote communication device, the request for triggering a lookup of the data in a directory associated with the at least one remote communication device; the interface is further enabled for receiving at least one message indicative that the data associated with the given network address is present in the directory. The communication device further comprises a processing unit for processing the at least one message.

BRIEF DESCRIPTIONS OF THE DRAWINGS

Figure 2:
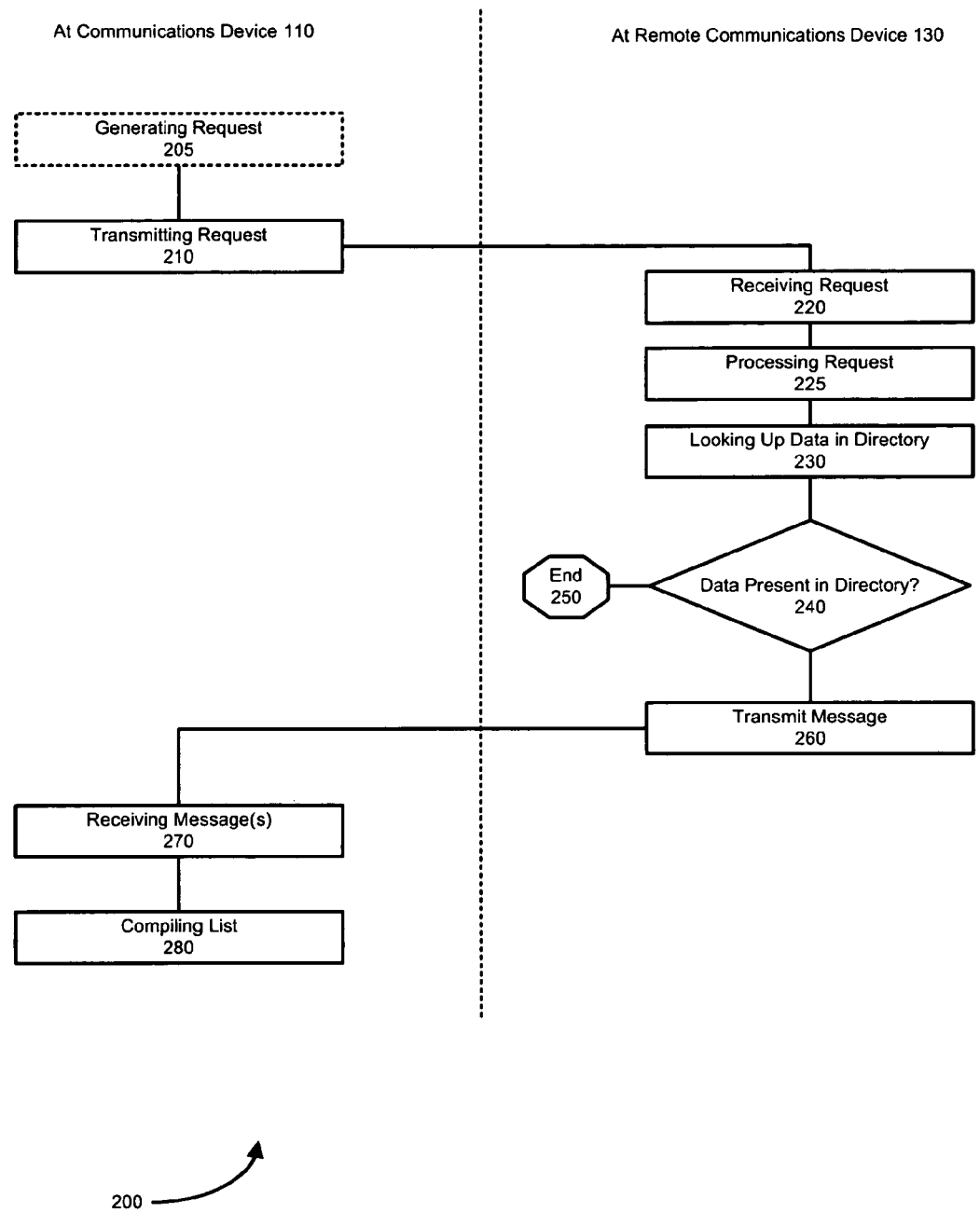

Embodiments are described with reference to the following figures, in which:

FIG. 1 depicts a system for identifying occurrences of a given network address, according to a non-limiting embodiment; and FIG. 2 depicts a method for identifying occurrences of a given network address, according to a non-limiting embodiment.

DETAILED DESCRIPTION OF THE EMBODIMENTS

FIG. 1 depicts a system for identifying occurrences of a given network address, the system comprising a communication device 110 coupled to a communication network 120, the communication device 110 enabled for transmitting a request 123 to at least one remote communications device 130*a*, 130*b*, 130*c*, 130*d*, ... 130*n* (collectively remote communications devices 130 and generically remote communications device 130), the remote communications device 130 also coupled to the communication network 120. The request 123 comprises data associated with the given network address, and triggers a lookup of the data in a directory associated with the remote communications device 130.

The given network address comprises a network address that is of interest to a user of the communications device 110. For example, the user may be a law enforcement official (or alternatively an administrator of the communications device working with the law enforcement official) and the given network address may comprise a network address of a person of interest to the law enforcement official. In another example, the user may be an employee of a company, and the given network address may comprise a network address of a customer or potential customer of the company (or alternatively, any other person of interest to the employee, e.g. another employee).

The data associated with the given network address may comprise a telephone number, an e-mail address, an IP address, a URL, a name of a person or a company associated with the given network address. Other data that may be associated with the given network address will occur to a person of skill of the art and is within the scope of embodiments described herein. The request 123 may further comprise a network address of the communications device 110.

The communication device 110 comprises an interface 140 configured to communicate with the remote communications devices 130 via the communication network 120. The communication network 120 may comprise a switched communication network, such as the PSTN, a packet based communication network, such as the internet, or a combination thereof. Further, the communication network 120 may be configured to communicate with the communication device 110 and/or the remote communications device 130 in a wired manner (e.g. via telephone lines and/or internet cabling), wirelessly (e.g. via cellular, WiFi, WiMax etc.), or a combination thereof. In some embodiments the communications network 110 may be a LAN or a WAN. The interface 140 is hence generally compatible with communication standards and protocols of the communication network 120. In some embodiments, the communications device 110 may further comprise a user interface (not depicted) for accepting the data associated with the given network address. In other embodiments, the communications device 110 may be in further communication with a computing device (not depicted), for example in the LAN or the WAN, and may be enabled to receive the data from the computing device.

In further embodiments, the computing device 110 may comprise a handheld electronic device (such as a PDA, and the like), which intermittently connects to the communication network 120 using a synchronisation application on a PC or Server device (not depicted).

In some embodiments, the communications device 110 may further comprise a processing unit 145 for processing data, for example a message 165 described in further detail below.

The remote communications device 130 (for example, remote communications device 130*n*) comprises an interface 150 which is generally compatible with communication standards and protocols of the communication network 120, similar to the interface 140. The remote communications device 130 further comprises a processing unit 152 for processing the request 123. In some embodiments, the remote communication device comprises a memory 155 for storing a directory DIR, the directory DIR for storing network addresses and other data, described below. In other embodiments, the directory DIR may be stored at a database 158 coupled to the communications network 120. In these embodiments, the remote communications device 130 is configured to retrieve network addresses from the directory DIR by transmitting a directory query 160 to the database 158 via the communications network 120. Further, the database is configured to respond to the directory query 160 with a directory response 161 transmitted back to the remote communications device 130 via the communications network 120, the directory response 161 indicative of the data being present in the directory DIR.

In some embodiments, the remote communications device 130 comprises a handheld electronic device, such a cell phone (e.g. remote communications device 130*a*), a PDA, and the like, configured to communicate wirelessly with the communications network 120. In other embodiments, the remote communications device 130 comprises a telephonic device (e.g. remote communications device 130*b*), configured to communicate over the communications network via ISDN signalling. In yet further embodiments, the remote communications device comprises a computing device (e.g. remote communications device 130*c*) enabled to communicate via the internet.

In each embodiment, the remote communications device 130 is enabled to receive the request 123 via the interface 150, the request 123 comprising the data associated with the given network address, and in response lookup the data in the directory DIR. In some embodiments, the lookup comprises looking up the data in the directory DIR stored at the memory 155. In other embodiments, the remote communications device further transmits the data to the database 158 via the directory query 160, the database 158 responding with the directory response 161 indicative of the data being present in the directory DIR.

The remote communications device 130 is further configured to transmit a message 165 back to the communications device 110, the message indicative that the data associated with the given network address is present in the directory DIR.

In some embodiments, the directory DIR comprises an electronic personal directory for storing contact information of interest to a user of the remote communications device 130. For example, the directory DIR may comprise an electronic personal directory stored in a cell phone, a PDA, a telephonic device (e.g. an ISDN enabled device), and the like. In other embodiments, the directory DIR may comprise a contacts module of personal information management (PIM) software, for example Outlook™ as manufactured by Microsoft of One Microsoft Way Redmond, Wash. 98052-7329 USA. In embodiments where the directory DIR is stored at the database 158, the directory DIR may comprise a contacts module of a webmail portal, such as Google™ Mail, from Google of 1600 Amphitheatre Parkway, Mountain View, Calif. 94043. In any event, the directory DIR stores data associated with contacts, including but not limited to the name of the contact, network addresses associated with the contact such as telephone numbers, e-mail addresses, IP addresses, a URL's, names of a persons or companies associated with the contact or a combination. Other data that may be stored in association with a contact will occur to one of skill in the art.

Attention is now directed to FIG. 2, which depicts a method 200 of identifying occurrences of a given network address. At step 210, the request 123 is transmitted to the remote communications device 130 by the communications device 110, the request comprising the data associated with the given network address. In some embodiments, the communications device 110 transmits the request 123 to a single remote communications device 130. In these embodiments, the request 123 further comprises a network address of the remote communications device 130, for example in a header of the request. In other embodiments, the request 123 is transmitted to a plurality of remote communications devices 130. In some of these embodiments, the request 123 comprises a plurality of network addresses each associated with a remote communications device 130. In other embodiments, the request 123 is transmitted to a plurality of remote communications devices 130 by broadcasting the request 123. For example, the request 123 may be broadcast to every remote communications device coupled to the communications network 120. In these embodiments, the request 123 may further comprise an indicator that is processable by a switch and/or a computing device within the communications network 120, the indicator indicating to the switch that the request 123 is to be broadcast. In some embodiments, the indicator may further comprise instructions on broadcasting the request 123, including but not limited to an indicator of a geographic area over which the request 123 is to be broadcast. In yet further embodiments, the communications device 110 transmits a plurality of requests 123, each of the plurality of requests 123 comprising a network address associated with a remote communications device 130; hence the data is transmitted to each of a plurality of remote communications devices 130.

In some embodiments, step 210 may be preceded by an optional step 205 in which the request is generated by the communications device 110. In these embodiments, the communications device 110 may receive a list and/or a range of network addresses associated with remote communications devices 130, as well as the data associated the given network address, and generate the request 123, or requests 123, accordingly. The list and/or range of network addresses and the data may be input by a user of the communication device 110 via the user interface (described above). In embodiments where the request 123 is to be broadcast, the communication device 110 may receive the data, and the indicator indicating that the request 123 is to be broadcast. In embodiments that do not comprise step 205, the request 123 may be received from the computing device described above.

At step 220, the request 123 is received by the remote communications device 130. At step 225, the request 123 is processed by the remote communications device 130, for example via the processing unit 152, to extract the data associated with the network address. In some embodiments, the request 123 may further comprise a security authorization code, and processing the request 123 further comprises extracting the security authorization code and comparing it to a reference security authorization code retrievable by the remote communications device 130 (e.g. either stored in the memory 155 or retrievable from the database 158 or computed according to an authorization algorithm known to one of skill in the art). In these embodiments, if the security authorization code is not similar to the reference security authorization code, the method 200 may end at step 225.

In other embodiments, the request 123 may have been encrypted by the communications device 110 (for example at step 205 or step 210), using a suitable encryption scheme. For example a PKI (public key infrastructure) private key may be used to encrypt the request at step 205 or step 210, the remote communications device 130 having been provisioned with an associated public key, in a previous provisioning step (not depicted). Other suitable encryption schemes, and provisioning techniques, will occur to one of skill in the art.

At step 230, the directory DIR is consulted to look-up the data to determine if the data is present in the directory DIR. In some embodiments, looking up the data comprises processing the directory DIR stored at the memory 155 along with the data. In other embodiments, looking up the data comprises transmitting the directory query 160 to the database 158, as described above. It is appreciated that the data is determined to be present in the directory DIR if there is a match in content regardless of formatting and/or notation and/or dialing prefix variations. For example, "(613) 592-2122 (work)", "16135922122", "6135922122" and "5922122" all represent the same number when on a communication device in the 613 area code.

At step 240 it is determined if the data is present in the directory DIR. In some embodiments, determining if the data is present in the directory DIR comprises receiving a positive indication from the database 158 within the directory response 161. In other embodiments, determining if the data is present in the directory DIR comprises finding the data stored in the directory DIR at the memory 155. In other words, it is determined if the data that was received via the request 123 (such as a name, a telephone number, an e-mail address, an IP address, a company name, etc.) is present in the directory DIR. If not the method 200 ends at step 250.

If so, however, at step 260 an indication that the data is present in the directory DIR is transmitted back to the communications device 110 via the message 165. The indication may comprise an identifier of the directory DIR and/or the remote communications device 130, for example a network address such as a telephone number, and IP address, an e-mail address, the name of a user associated with the remote communications device 130, a MAC address and the like. In some embodiments where the request 123 is transmitted to a single remote communications device 130, however, the message 165 may not comprise an identifier of the directory and/or the remote communications device 130, as it will be generally understood that the message 165 was transmitted by the remote communications device 130 to which the request 123 was transmitted.

In some embodiments, the indication may comprise a flag indicative that the data is present in the directory DIR, for example a "1" if the data is present. In other embodiments, the indication may comprise text indicative that the at least a portion of the data is present in the directory Dir, for example "Present". In yet further embodiments, the indicator may comprise at least portion of the data associated with the given network address which is present in the directory DIR, for example a name, telephone number, an e-mail address etc. The message 165 may further comprise a network address of the communications device 110, for example in a header, such that the communications network 120 relays the message 165 to the communications device 110. The network address of the communications device 110 may be determined by processing the request 123.

At step 270, the message 165 is received at the communications device 110. In some embodiments, the message 165 may further comprise a security authorization code similar to that described above, and the security authorization code further compared to a reference security authorization code available to the communications device 110. Further, in other embodiments, the message 165 may be encrypted at step 260 similar to encryption techniques described above and decrypted at the communications device 110.

It will be recalled that in some embodiments, the request 123 (or requests 123) is received by a plurality of remote communications devices 130. Hence in some embodiments, at step 270, the communication device 110 may a receive a plurality of messages 165, each from a remote communication device 110, each of the plurality of messages 165 comprising an identifier of the directory DIR and/or the remote communications device 130 that transmitted the message 165. Hence a list of remote directories (e.g. directory DIR) and/or remote communications devices 130 associated with data associated with the given network address may be compiled, for example by the communication device 110 at step 280. In these embodiments, the processing unit 145 may compile the list by processing the message(s) 154. Alternatively, the message 165 (or messages 165) may be forwarded onto the computing device for processing. The list may further comprise all or a portion of the data which was transmitted to the communication device 110 via the message 165.

Hence, by transmitting the request 123 comprising data associated with the given network address to at least one remote communications device 130, the request 123 for triggering a lookup of the data in a directory DIR associated with the at least one remote communications device 130, occurrences of the given network address in remote directories, such as directory DIR and/or the remote communications devices 130 may be determined. The list of directories and/or remote communications devices 130 may be used by law enforcement officials, company employees etc. in a suitable manner.

In some embodiments, an industry protocol may comprise the method 200 and regulatory bodies may dictate that remote communications devices 130 be adapted to respond to the request 123 in the manner described above. The definition of suitable security authorization codes and encryption techniques, as well as provisioning of such, may form part of the industry protocol.

In some embodiments, the request 123 may comprise a plurality of data associated with the given network address. In these embodiments, the message 165 is indicative that at least a portion of the plurality of data associated with the given network address is present in the directory DIR, determined at step 240 of the method 200. In some of these embodiments, the request 123 may further comprise an indication of criteria to be applied in determining if at least a portion of the plurality of data is present in the directory DIR. For example the plurality of data may comprise: "613-555-2122", "Tom Smith," "Mitel Corporation", and "Mitel Networks". The indication of criteria to be applied may comprise "match at least one" "match at least two", and/or match specific data, the specific data defined in the indication of criteria.

In some embodiments, method 200 may be offered as a Phone Number Change Service provided, for example, by a Telco. In these embodiments, a customer of the Telco may request (and pay a fee for) the Phone Number Change Service, if a phone number of the customer changes. The Telco would initiate the transmitting of the request 210 in method 200 determine remote communication devices which are associated with directories which comprise an old phone number of the customer. In the Phone Number Change Service, the customer could be provided with a list of network identifiers of remote communication devices that are associated with directories which comprise the old phone number. Alternatively, a phone number change notice could be transmitted to each of the remote communication devices that are associated with directories which comprise the old phone number, to inform the remote communication devices of a new number of the customer.

Those skilled in the art will appreciate that in some embodiments, the functionality of the communications device 110 and the remote communications device 130 may be implemented using pre-programmed hardware or firmware elements (e.g., application specific integrated circuits (ASICs), electrically erasable programmable read-only memories (EEPROMs), etc.), or other related components. In other embodiments, the functionality of the communications device 110 and the remote communications device 130 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of identifying occurrences of a given network address in at least one personal electronic directory, the directory comprising stored information pertaining to personal contacts, comprising, transmitting a request comprising data associated with the given network address to at least one remote communication device coupled to at least one personal electronic directory, said request for triggering a lookup in the coupled directory associated with said at least one remote communication device;

searching within the coupled directory for at least a partial match of said data associated with the given network address; and if at least a partial match is found, receiving at least one message from at least one remote communication device, the message comprising an identifier of the remote communication device sending the message and signifying that said data associated with the given network address is present within said directory coupled to the sending remote device without including any information from said directory, wherein a list comprising the identification of the at least one remote communication device able to find at least a partial match of said data is generated.

2. The method of claim 1, further comprising generating said request.

3. The method of claim 1, wherein said data comprises at least one of a telephone number, an Internet protocol address, a URL, an e-mail address, a name of a user associated with the network address and a name of a company associated with the given network address.

4. The method of claim 1, wherein said message further comprises a network address associated with said sending remote communication device and a network address of said coupled directory.

5. The method of claim 4, further comprising compiling a list of directories which contain the given network address, from said at least one message.

6. The method of claim 1, wherein said transmitting comprises transmitting said request to a plurality of remote communication devices, said plurality of remote communication devices comprising said at least one remote communication device.

7. The method of claim 1, wherein said request is packet based.

8. The method of claim 7, wherein said request comprises a SIP request.

9. The method of claim 1, wherein said request comprises an ISDN signal.

10. The method of claim 1, further comprising encrypting said request.

11. The method of claim 1, said request further comprising a security authorization code.

12. The method of claim 1, wherein said message comprises a flag indicative that said data associated with the network address is present in said directory.

13. The method of claim 1, wherein said identifier comprises at least one of a telephone number, and IP address, an e-mail address, the name of a user associated with the remote communications device, and a MAC address.

14. The method of claim 1, wherein said request is encrypted, and further comprising decrypting said request.

15. A communications device for identifying occurrences of a given network address in at least one personal electronic directory, the directory comprising stored information pertaining to personal contacts, comprising,
an interface enabled for:
transmitting a request comprising data associated with the given network address to at least one remote communication device coupled to at least one personal electronic directory, said request for triggering a lookup of at least a partial match of said data in the coupled directory associated with said at least one remote communication device; and
receiving at least one message from at least one remote communication device, the message comprising an identifier of the remote communication device sending the message and signifying that said data associated with the given network address is present within said directory coupled to the sending remote device without including any information from said directory; and
a processing unit for processing said at least one message and compiling a list comprising the identification of the at least one remote communication device able to find at least a partial match of said data.

16. The device of claim 15, wherein said data comprises at least one of a telephone number, an internet protocol address, a URL, an e-mail address, a name of a user associated with the network address and a name of a company associated with the given network address.

17. The device of claim 15, wherein said request is transmitted to a plurality of remote communication devices, said plurality of remote communication devices comprising said at least one remote communication device.

18. The device of claim 15, wherein said identifier comprises at least one of a telephone number, and IP address, an e-mail address, the name of a user associated with the remote communications device, and a MAC address.

* * * * *